May 11, 1965   D. D. DONOHOO, JR., ETAL   3,182,907
BUSINESS MACHINE RACK STOPPING MECHANISM
Filed Dec. 24, 1962   7 Sheets-Sheet 4

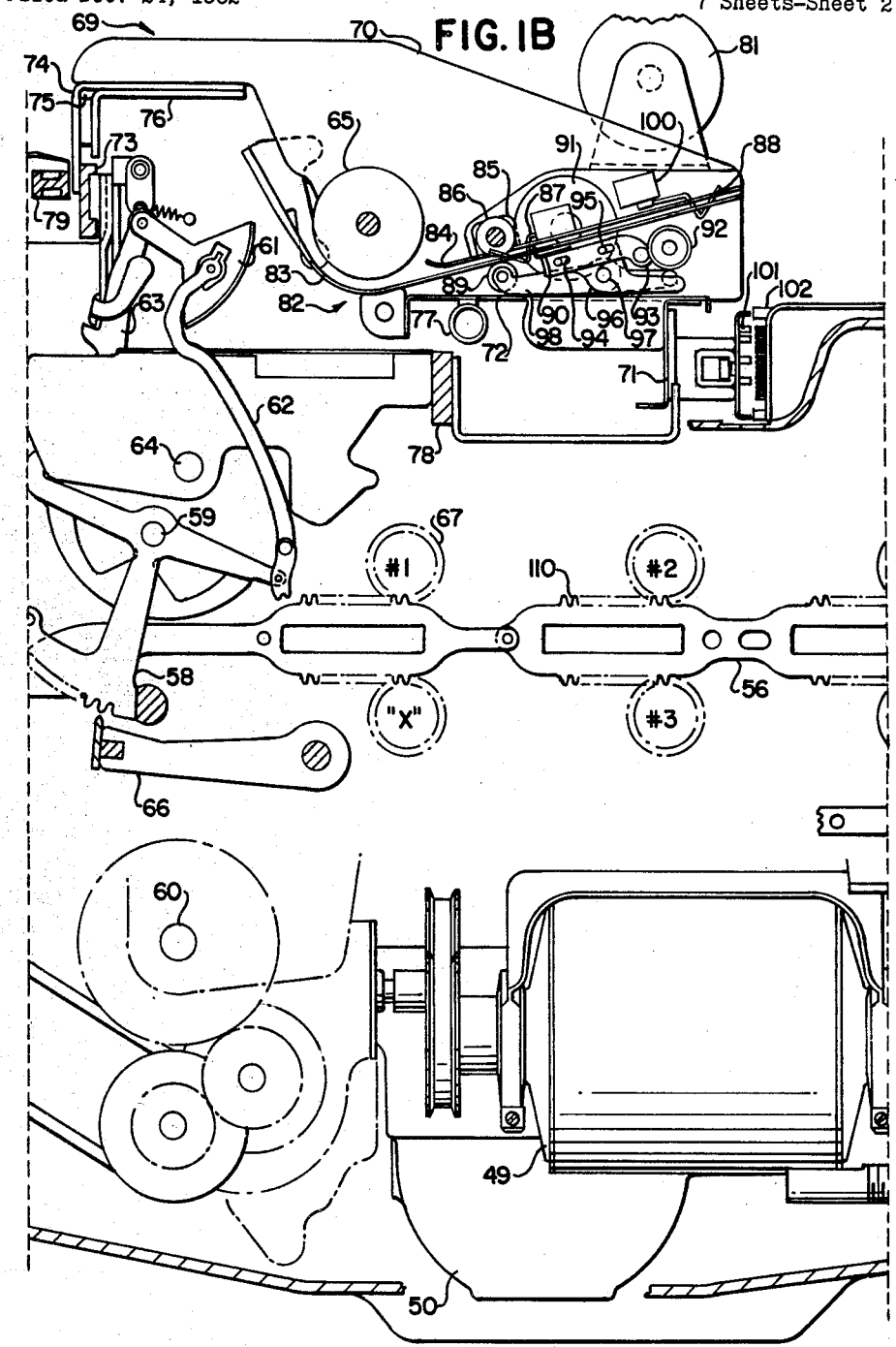

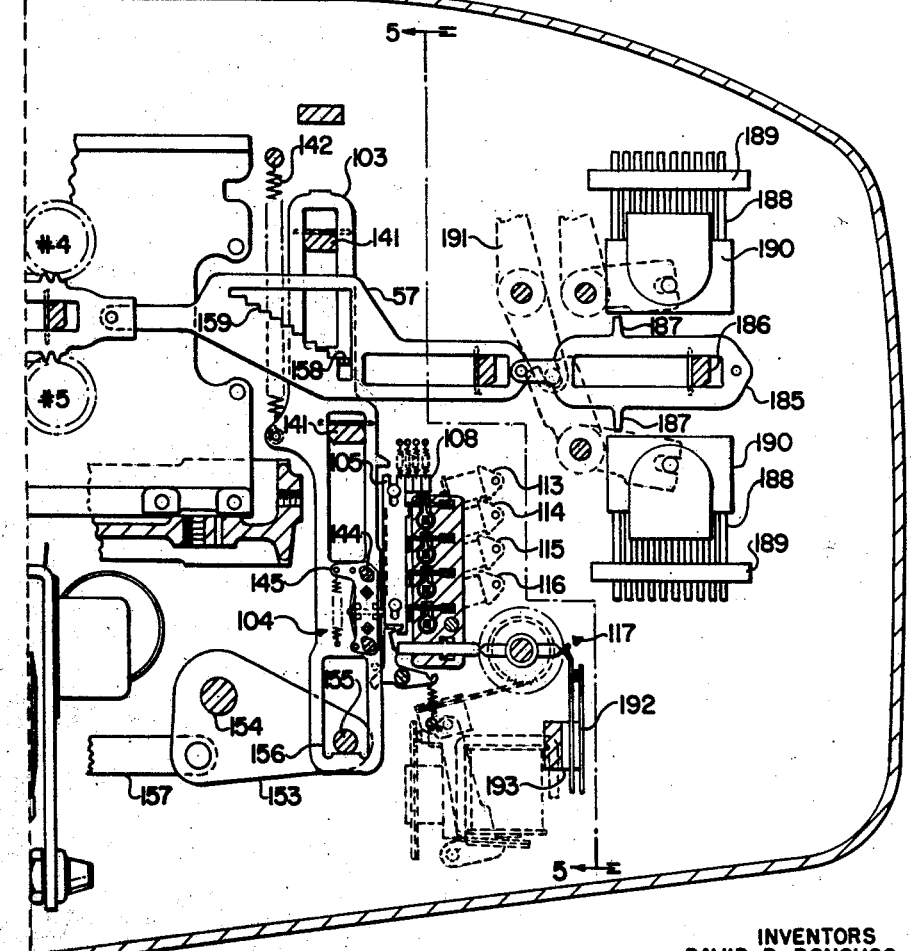

INVENTORS
DAVID D. DONOHOO, JR. &
EDGAR H. SONNANSTINE, JR.

BY

THEIR ATTORNEYS

May 11, 1965  D. D. DONOHOO, JR., ETAL  3,182,907
BUSINESS MACHINE RACK STOPPING MECHANISM
Filed Dec. 24, 1962  7 Sheets-Sheet 5
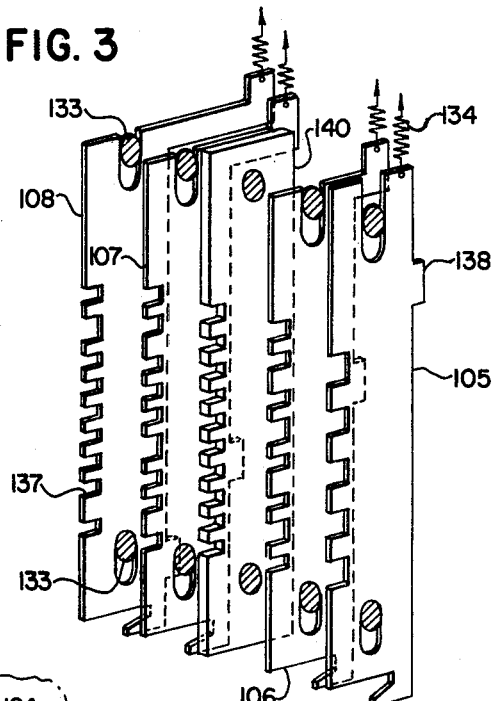
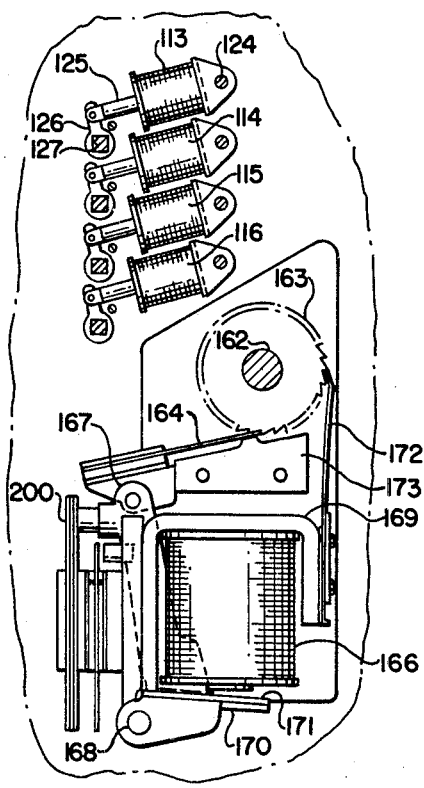
INVENTORS
DAVID D. DONOHOO, JR. &
EDGAR H. SONNANSTINE, JR.
BY
THEIR ATTORNEYS

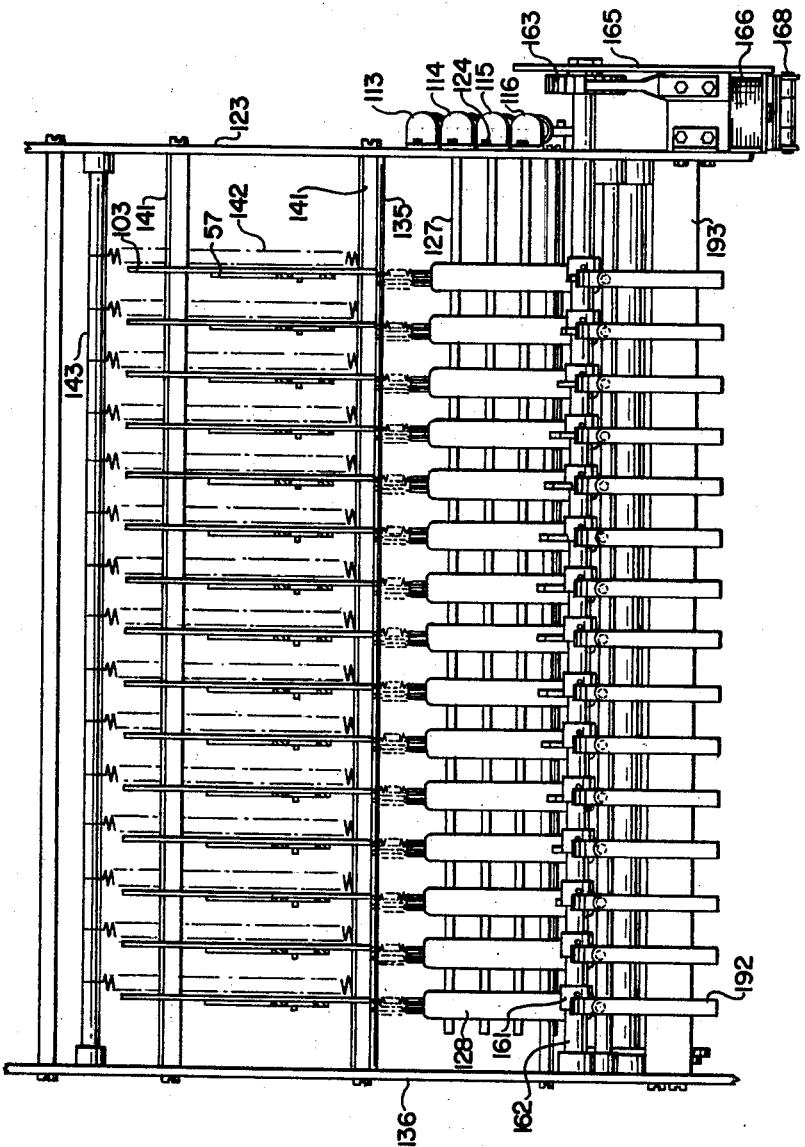

May 11, 1965 D. D. DONOHOO, JR., ETAL 3,182,907
BUSINESS MACHINE RACK STOPPING MECHANISM
Filed Dec. 24, 1962 7 Sheets-Sheet 7

INVENTORS
DAVID D. DONOHOO, JR. &
EDGAR H. SONNANSTINE, JR.

BY

*Louis A. Kline*
*Richard W. Larin*
THEIR ATTORNEYS 3,182,907
BUSINESS MACHINE RACK STOPPING
MECHANISM
David D. Donohoo, Jr., Centerville, and Edgar H. Sonnanstine, Jr., West Carrollton, Ohio, assignors to The National Cash Register Company, Dayton, Ohio, a corporation of Maryland
Filed Dec. 24, 1962, Ser. No. 246,804
10 Claims. (Cl. 235—61)

This invention relates to improvements in cash registers, accounting machines, and the like and is more particularly directed to such a machine having means capable of receiving information in the form of electrical signals and of introducing such information into the machine, so that said information may be altered by a subsequent machine operation.

The machine of the instant invention is to be used for banking operations by a teller in updating the account of a depositor. In the example disclosed herein, the old balance of the depositor is contained on magnetic stripes located on the depositor's ledger card. This information is in the form of a binary code. During the updating operation, the ledger card is inserted into the machine, wherein the old balance is first read from the magnetic stripes and then stored in the totalizer of the machine. Information concerning the current transaction is set up on the keyboard of the machine, and this information is then added to or subtracted from the old balance in the totalizer, depending on the nature of the transaction. In a subsequent operation of the machine, this new balance is transferred from the totalizer of the machine and recorded, in binary code, onto the magnetic stripes on the ledger card, and this completes the updating of the depositor's account. It is therefore an object of this invention to provide means for reading binary code from magnetic stripes located on a ledger card and to translate this information and insert it, in the form of a decimal code, into the totalizer of an accounting machine.

It is a further object of this invention to provide a mechanism for sequentially controlling the positioning of a plurality of amount racks of an accounting machine commensurate with information that is sequentially read from a ledger card.

It is another object of this invention to provide a mechanism which can be controlled by racks of an accounting machine to transmit data from said racks to magnetic stripes located on a ledger card.

It is a further object of this invention to provide a readout mechanism for sequentially actuating a series of code-converting devices whereby information contained in said devices is transferred to the amount racks of an accounting machine.

It is another object of this invention to provide a control mechanism which is operable to actuate a code-converting device in a timed sequence with the introduction of coded information into said converting device.

With these and other, incidental, objects in view, the invention includes certain novel features of construction and combinations of parts, a preferred form or embodiment of which is hereinafter described with reference to the drawings which accompany and form a part of this specification.

In said drawings,
FIGS. 1A, 1B, and 1C taken together constitute a longitudinal sectional view of the accounting machine, showing only those parts which are required for operation of this invention.

FIG. 3 is an exploded side elevational view of the coded slide bars used for controlling the position of its associated auxiliary rack mechanism.

FIG. 4 is a side sectional view of the actuator mechanism of the serializer and the solenoids for indexing the coded slide bars.

FIG. 5 is a detailed sectional view taken along the line 5—5 of FIG. 1, showing each rack-stopping mechanism and the serializer.

Figure 1A:
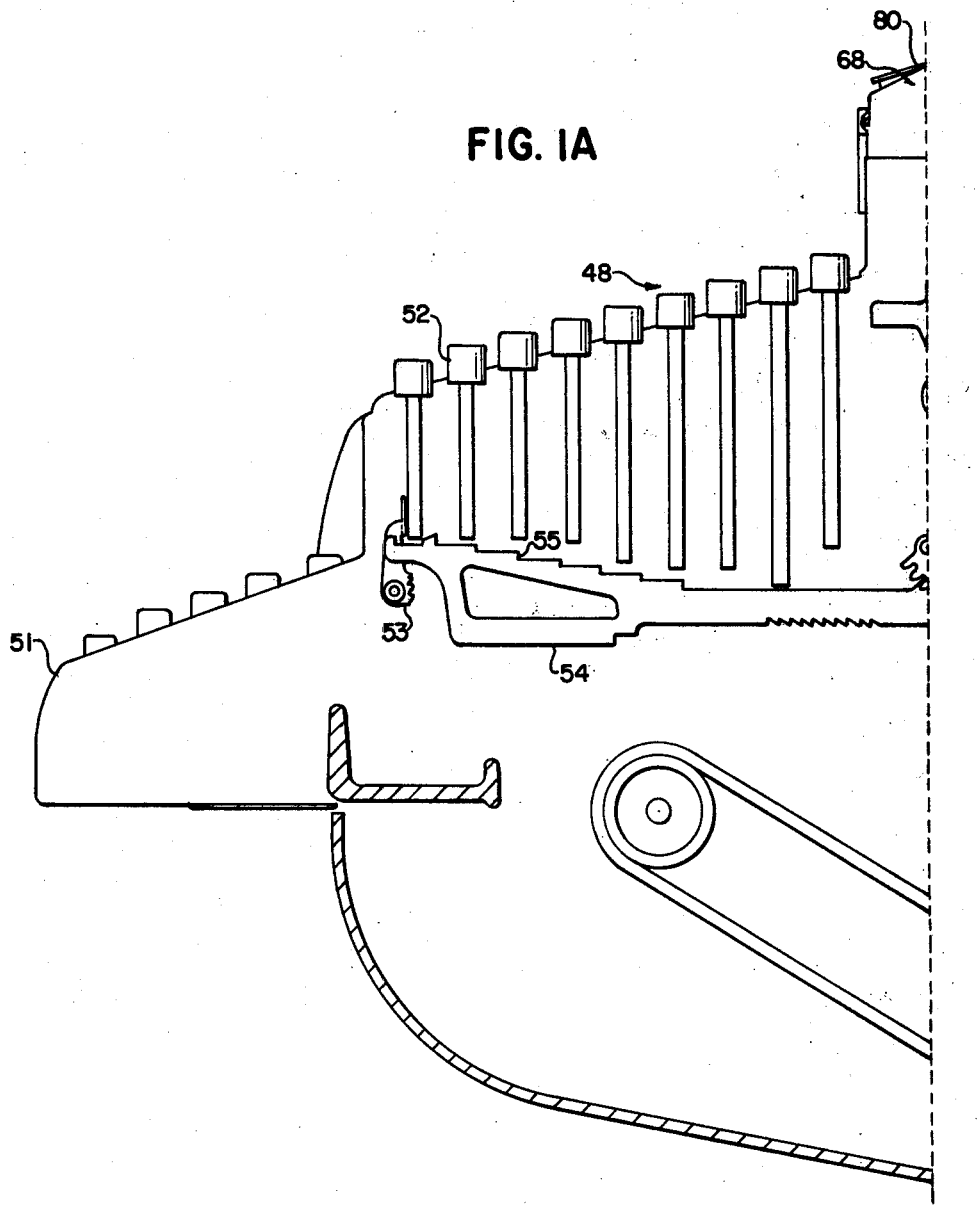

The accounting machine chosen to illustrate the various features of the present invention is of the type described in Letters Patent of the United States No. 2,626,749, issued January 27, 1953, to Raymond A. Christian et al., to which reference may be had for complete disclosure of the standard features not pertinent. Only those features necessary to the operation of the invention will be fully illustrated and described herein.

Like previous machines of this type, the accounting machine is provided with a laterally-shiftable traveling carriage, which may be tabulated in either direction from one columnar position to another, or, if required, said carriage may be skip-tabulated through intervening columnar positions from one columnar position to a pre-selected columnar position. The present accounting machine is provided with a front-feed mechanism, which opens and closes at the front of the platen for the insertion and removal of record material, such as a ledger card.

The accounting machine as disclosed herein is provided with a full complement of amount keys, which controls the positioning of differential actuator mechanisms, which in turn control the setting of type carriers for recording the value of the effective amount keys upon the record material supported by the traveling carriage platen, said actuators also controlling the entering of said values, either positively or negatively, into the wheels of the selected totalizer.

The accounting machine of the instant invention has been modified to include a magnetic reading head to read information contained on stripes of magnetic material mounted on ledger cards. Also included are switches set by the racks of the accounting machine to control the reading head for the insertion of the information into the magnetic stripes of the ledger card. The reading head and operation is similar to that disclosed in the copending application of Patrick B. Close et al., Serial No. 859,598 now Patent No. 3,112,394, filed December 15, 1959, while the read-out switches are of a type similar in construction and operation to those shown and described in United States Letters Patent No. 2,332,755, issued October 26, 1943, to William H. Robertson and Eric R. Coe.

The accounting machine is provided with a continuously-running motor 49 (FIG. 1), which drives the usual fluid coupling mechanism 50 (FIG. 1), for moving the traveling carriage in either tabulating or return direction. The motor also operates through a main clutch mechanism controlled by depression of release or starting bars located on the accounting machine keyboard, to drive said machine through one cycle of operation, which is required for all types of functions performed by the machine. In addition to the manual control of the main clutch by the starting bars to initiate a machine operation, said clutch may be automatically controlled through the medium of the traveling carriage in pre-selected columnar positions thereof, in all operations except overdraft total-taking or credit balance operations, in which said clutch must be controlled by the use of the manually-operable release or starting bars.

The present accounting machine is provided with the well-known electric typewriter mechanism 51 (FIG. 1), as disclosed in the previously-mentioned Christian et al. United States patent, for typing data of a descriptive or other nature on the record material supported by the traveling carriage platen. However, this is a matter of choice, and the electric typewriter mechanism may be omitted if it is not necessary in connection with the business system to which the machine is being applied.

The machine, as arranged at present, is provided with six lines of shiftable totalizers located at its rear, one of said lines supporting a crossfooter, or balance totalizer, for the computation of positive and negative amounts, and the other of said lines providing five group, or storage, totalizers. The balance totalizer may be selected and conditioned for engagement with and disengagement from the single set of amount or differential actuators, in proper timing for the type of operation being performed, by means of adjustable stops located on the front of the traveling carriage in pre-determined columnar positions thereof, or, if necessary or desirable, by means of a full complement of corresponding control keys. In a similar manner, the different group or storage totalizers may be selected and conditioned for actuation, by the single set of actuators, by means of the traveling carriage in a predetermined columnar position thereof, with the exception of a total-taking function in said totalizers, which may be controlled either by the traveling carriage or by means of corresponding control keys.

With reference to FIGS. 1A, 1B, and 1C, there is shown a greatly simplified cross-sectional view of the accounting machine, which is essentially the same as that shown in detail in FIGS. 3A and 3B of said aforementioned Christian et al. United States Patent No. 2,626,749, and fully described therein. Only that portion of the mechanical structure of the accounting machine disclosed in the aforementioned patent which is necessary for an understanding of the invention will be described herein.

The accounting machine is provided with a keyboard generally indicated at 48 (FIG. 1A), having ten rows of amount keys 52 and four rows of date and symbol keys (not shown), the keyboard being mounted at the front of the machine. FIGS. 1A, 1B, and 1C show a typical denominational row of amount keys 52. Depression of any one of the amount keys 52 actuates a slide (not shown), which results in the counter-clockwise rocking of a zero stop pawl 53 (FIG. 1A). This movement of the zero stop pawl releases for movement to the rear of the machine a rack or differential actuator 54. The rack 54 will thus be permitted to move toward the rear of the machine until one of the shoulders 55 formed thereon engages the lower portion of the depressed key 52 to stop the rack after it has moved a distance commensurate with the value of the depressed key.

All of the racks 54 are guided at their rear ends for straight-line movement during their travel by means of a slotted bar (not shown) supported between the side frames of the machine. Each of the racks 54 associated with a particular amount row of the keyboard is connected to an extension actuator 57 by means of a coupling actuator 56. Both the coupling actuator and the extension actuator are guided for a straight-line sliding movement, so that the exact linear translational movement of the amount rack 54 is transmitted to the corresponding extension and coupling racks.

Each of the amount racks 54 is provided with a vertical slot (not shown) for receiving a stud mounted on a reducer arm segment 58 (FIG. 1B), which, in turn, is freely rotatable on a reducer arm shaft 59 journaled at either end in the side frames of the machine. As more fully disclosed in the aforementioned Christian et al. United States patent, when the main cam shaft 60 is rotated through one revolution by the motor 49, the amount racks are moved toward the rear of the machine during the first half of the machine cycle until each is stopped by its respective depressed key, as disclosed previously. Thereafter, during the second half of the machine cycle, all the racks are restored to their home position, as shown. This movement of the racks is transmitted to the reducer arm segment 58, which in turn rotates a type sector 61 by means of a link 62 to position said type sector according to the digital position of the amount rack.

The type sector 61 is pivotally connected to the upper end of a printer arm 63, which is rotatably mounted on a printer shaft 64. The printer arm 63 is spring-urged for clockwise movement, as viewed in FIG. 1B, thereby causing the type sector 61 to be driven against a record material positioned around a platen roll 65 during the second half of the machine cycle. After the type sector 61 has been positioned during the first half of the machine cycle, an aligner bar 66 is rocked into engagement with the aligning notches formed on the lower end of the reducer segment 58 so as to precisely align all of the type sectors in their differentially-set positions. After the printing operation is completed, the aligner bar 66 is disengaged from the reducer arm aligning notches, thus permitting the racks and the type sectors to return to their home positions.

The machine shown in the present drawings is provided with six add-subtract totalizers 67, each having a capacity of 99,999,999.99. As illustrated in FIGS. 1B and 1C, the totalizers are numbered from 1 to 5 inclusive, with one designated as the "X" totalizer, which is used in overdraft operations. Each of the totalizers includes one gear wheel for each of the denominational orders of the numbers, with each gear wheel having twenty teeth formed along its periphery. All of the gear wheels of the totalizers are located in a co-planar relationship with respect to the amount racks 54 and the coupling racks 56, and are adapted to be selectively engaged with and disengaged from teeth 110 formed on each of the racks in order to permit keyboard entries to be transferred therein and to perform the various calculating functions of the machine.

Located beneath the control keys of the keyboard are a plurality of totalizer control slides (not shown), which selectively effect the engagement and disengagement of totalizers 2 to 6 with respect to their respective amount racks. The type of operation to be performed in any of the totalizers, such as add, subtract, total, or non-total, is determined by the distance through which its associated totalizer control slide is permitted to move. The movements of these slides are controlled by carriage stops (not shown), which are mounted on the traveling carriage, indicated generally as 69 (FIG. 1B), or by control keys (not shown) located on the keyboard. As a complete understanding of the totalizer controlled apparatus necessary to carry out the above-mentioned cycles of operation is not believed necessary for a full and complete understanding of the present invention, a detailed description thereof is not given herein. However, such a detailed decription may be found in the aforementioned Christian et al. United States patent and, consequently, will not be repeated herein.

The traveling paper carriage 69 (FIG. 1B) of the accounting machine consists of a framework which includes a housing 70 supported by means of a Z-bar 71, an L-bar 72, and an I-bar 73, to which the housing is secured by means of screws or other fastening means. The I-bar is secured at either of its ends to a bracket 74, which is bonded to a block of rubber 75 which is in turn bonded to a second bracket 76, secured to the housing by suitable fastening means. The thus-constituted carriage frame is supported for transverse sliding movement on the accounting machine frame by means of a tube 77 secured to the under side of the L-bar 72, which tube cooperates with a series of grooved rollers (not shown) which are rotatably secured to a rail 78 extending along the top of the accounting machine frame. The forward portion of the carriage is supported on rolls (not shown) which are received within a groove formed in the I-bar 73. The carriage is driven in either direction across the machine by a gear train (not shown) operated by the fluid coupling mechanism 50. Controlling the tabulating movement of the carriage back and forth across the machine and also to enable the carriage to control the various functions of the accounting machine are a series of carriage stops (not shown) removably secured to an I-shaped stop bar 79 (FIG. 1B) carried by the traveling carriage. The stops and the I-shaped bar are enclosed within a cover 80. Reference should be made to the aforementioned Christian et al. United States patent for a more complete disclosure of the carriage support structure, the carriage drive mechanism, and the carriage stops.

In carrying out the updating of a customer's account, the first step taken is the reading of the old balance from the customer's ledger card in a manner which will now be described. Rotatably mounted on the traveling paper carriage framework 69 is the platen roll 65 for supporting a record material, such as a journal sheet, in a printing position, said journal sheet, in this instance, being unwound from a supply roll 81 (FIG. 1B) mounted on the rear of the traveling carriage. Positioned adjacent to the platen roll 65 is a chute, generally indicated as 82, composed of a lower guide member 83 and an upper guide member 84, the latter being located at the rear of the carriage. Mounted in an aperture (not shown) in the upper guide member 84 are a reading head 85, a drive roller 86, and a pair of sensing feelers 87, 88, each of said feelers constituting a switch arm of an associated switch. Located adjacent the lower guide member 83 and mounted for movement through said member are a pressure roller 89 and a movable stop member 90. In an operation for printing or posting the old balance, the operator will insert a customer ledger card into the chute 82 around the platen 65. As the ledger card moves through the chute, it engages and trips the sensing feelers 87 and their associated switches, thereby initiating the operation of a motor (not shown) which drives a cam line 91 (FIG. 1B) mounted in the carriage framework. Mounted beneath the chute 82 at the rear of the carriage is a cam 92, which also is operated by the carriage motor. Mounted for longitudinal movement adjacent the cam 92 is a cam follower 93, on which the stop member 90 is mounted. The cam follower 93 contains two elongated slots 94, each slot having positioned therein a stud 95 secured to a support member 96, which in turn is rotatably mounted on a shaft 97 supported within the framework of the carriage. Rotation of the cam 92 results in the longitudinal movement of the cam follower 93 toward the front of the machine, resulting in the stop member 90 engaging the ledger card and moving it toward the front of the machine. This movement of the card insures that its leading edge is properly aligned before a reading operation commences. Continued rotation of the cam 92 rocks the support member 96 counter-clockwise about the shaft 97 as viewed in FIG. 1B, thereby withdrawing the stop member from engagement with the ledger card. Simultaneously with this operation, the cam 92 engages and rocks clockwise a cam follower 98, the other end of which rotatably supports the pressure roller 89. This clockwise movement of the pressure roller 89 engages the ledger card and forces the card into engagement with the drive roller 86, resulting in the ledger card's being driven through the chute 82 to the rear of the machine preparatory to the positioning of the card at a new printing line in a manner that will now be described.

Figure 6:
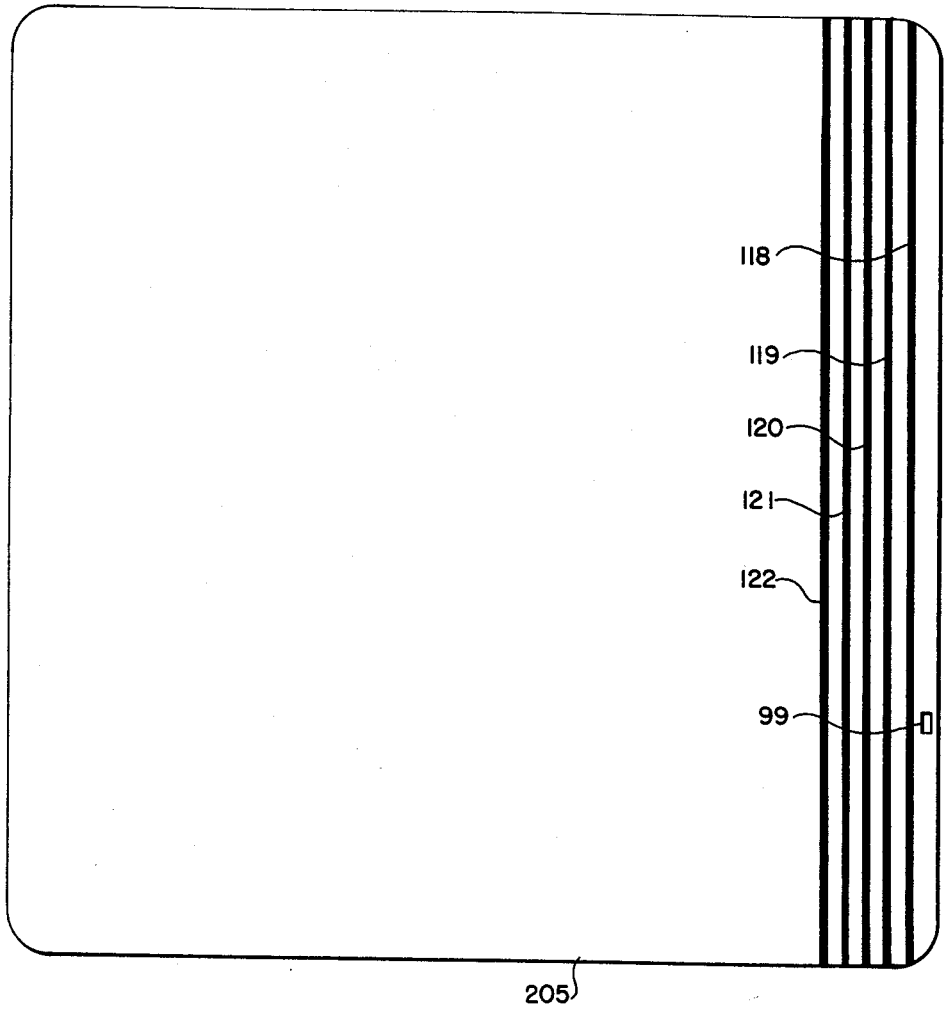
FIG. 6 is a detailed view of the ledger card, showing the tracks of magnetic tape on which information to be used is stored.

Shown in FIG. 6 is a typical ledger card 205, having located along one of its edges five stripes 118 to 122 inclusive, of magnetic material. The first four stripes, 118 to 121 inclusive, located from the edge of the card contain signals representing the old balance in the form of the binary code numbers 1, 2, 4, and 8, respectively. The fifth, or inner, strip 122 provides a signal for controlling the positioning of the ledger card on a predetermined line of the ledger card, so that the printing of the old balance will be made on the selected line. As described above, the ledger card is driven by the drive roller 86 towards the rear of the machine. During this movement, the data-containing magnetic stripes 118 to 121 inclusive move past the reading head 85, which reads the old balance in the form of a binary code from the four magnetic stripes. The data read from the magnetic stripes controls the positioning of a number of rack-stopping mechanisms in a manner to be described hereinafter. During this rearward movement, a hole 99 (FIG. 6), located in the card, is sensed by the feeler 88, which actuates its associated switch 100 (FIG. 1B). The operation of the switch 100 reverses the directional drive of the drive roller 86, resulting in the driving of the ledger card back toward the front of the machine. During this forward movement, the reading head 85 reads the fifth magnetic stripe 122 and controls the operation of the drive roller 86 so as to stop the movement of the ledger card when it has reached the proper printing line. The ledger card is now positioned so as to allow the old balance to be printed by the type sector 61 during a subsequent machine operation, as will be described hereinafter. As may be seen from FIG. 1B, mounted on the rear of the carriage framework are a series of contact arms 101, which coact with a series of switches 102 mounted at various positions across the length of the machine. These contacts provide automatic operation of the motor (not shown) for operating the drive roller 86 at predetermined positions of the carriage in a manner similar to the carriage stops located on the front of the machine. For a fuller disclosure of the ledger card drive mechanism and the associated reading head, reference should be made to the aforementioned Close et al. United States patent application, Serial No. 859,598.

Mounted at the rear of the accounting machine is the rack-stopping mechanism for positioning the racks 54 of the amount banks in accordance with the old balance data read from the magnetic stripes of the ledger card. This mechanism operates in sequence with the driving of the ledger card past the reading head 85 during the reading of the old balance, as disclosed previously. As will be described more fully hereinafter, auxiliary racks are set according to the old balance data read from the ledger card for controlling the positioning of the racks 54 of each amount row, beginning with row 1 of the keyboard. After all of the auxiliary racks have been set and the ledger card has been located in a printing position, a machine operation is initiated in which means (not shown) located in the traveling carriage move to grip the ledger card and the racks 54 are set according to the position of the auxiliary racks. This setting of the racks 54 represents the information read from the ledger card—in this example, the old balance. During the setting of the racks 54, the appropriate totalizers 67 are moved into engagement with the racks, and the type sectors 61 are positioned and driven to print the old balance on the ledger card. Engagement with the racks 54 by the totalizers during this machine operation adds the old balance into the totalizer. The carriage framework then moves to the next position, as programmed by the carriage stops located at the front of the carriage. At this position, the amount of the transaction is indexed on the keyboard, and the machine is cycled to add this amount to or subtract it from the old balance in the totalizer. The carriage of the accounting machine is then moved to the next position for a machine operation, during which time the appropriate totalizers engage and control the racks 54 for positioning according to the new balance. A series of switches located at the rear of each amount rack 54 are set to represent this new balance. The racks 54 also control the positioning of the type sectors 61 to print this new balance on the ledger card. After a printing operation has occurred, the drive roller 86 and the pressure roller 89 operate to drive the ledger card toward the rear of the machine until the sensing feelers 88 engage the hole 99 in the ledger card, thereby reversing the movement of the ledger card in the same manner as described previously. At this time, the switches set by the racks 54 are read out, and the new balance is then entered into the magnetic stripes in the ledger card by the reading head 85, which now functions as a write head. After this has occurred, the ledger card is then removed from the carriage of the accounting machine.

Referring now to FIGS. 1C, 2, 3, 4, and 5, there are shown various views of the rack-stopping mechanism, there being one rack-stopping mechanism for each rack 54 of an amount bank. Each rack-stopping mechanism is composed of an auxiliary rack 103, an auxiliary rack-stopping carriage generally indicated as 104, a plurality of coded slide bars 105 to 108 inclusive, which control the positioning of the auxiliary racks 103, and a plurality of blocking slides 131 for controlling the positioning of the coded slide bars. Associated with all of the rack-stopping mechanisms of the machine is a plurality of solenoids 113 to 116 inclusive, each operating one of the blocking slides 131, and a serializer generally indicated as 117 for the sequential control of each rack-stopping mechanism. The manner in which each rack-stopping mechanism operates will now be described through a description of the machine operation. As previously described, there are five magnetic stripes 118 to 122 inclusive, mounted on the ledger card, the stripes 118 to 121 inclusive containing signals representing the binary code numbers 1, 2, 4, and 8, respectively. The stripe 122 contains signals representing the first line for printing on the ledger card. During the rearward movement of the ledger card preparatory to the positioning of the card at a printing line, the reading head 85 reads across the magnetic stripes 118 to 121 inclusive from the lower portion of the ledger card 205 toward the top in a sequence which provides data which is to be consecutively entered into the amount banks 1 to 14 inclusive. When a signal is read from the stripe 118, the solenoid 113 is actuated in a manner well known in the art. Likewise, the solenoid 114 is controlled by signals read from the stripe 119, the solenoid 115 from the stripe 120, and the solenoid 116 from the stripe 121. As shown in FIGS. 4 and 5, each of the solenoids is attached to a side frame 123 of the accounting machine by means of a screw 124. Each solenoid has a plunger 125 (FIG. 4), one end of which has rotatably mounted thereon an arm 126 and the other end of which engages a transverse square rod 127. Each of the other solenoids is similarly so arranged. Energization of any of the solenoids results in the rocking of the square rod 127 clockwise as viewed in FIG. 4. As shown in FIG. 5, each of the square rods extends lengthwise of the machine, coacting with a rack-stopping mechanism of each amount bank in a manner that will now be described.

Figure 2:
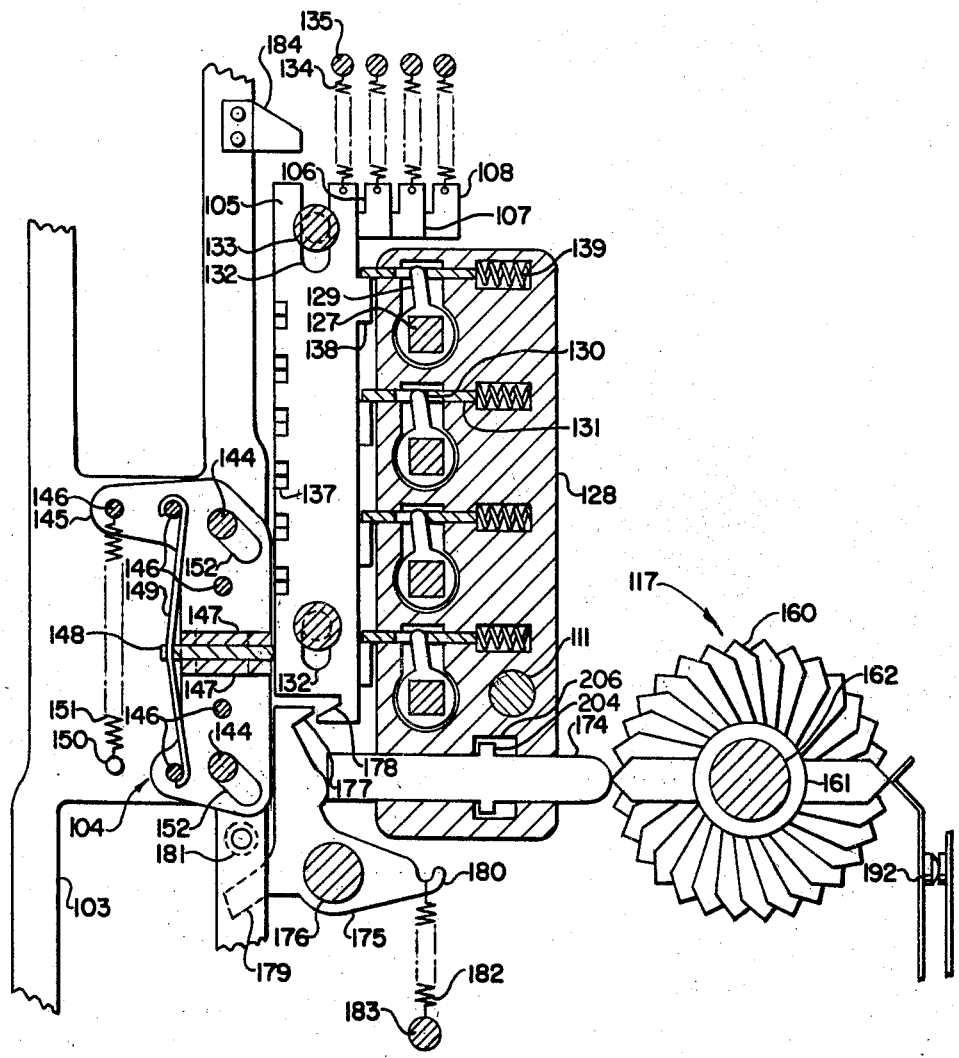
FIG. 2 is an enlarged detail view of the rack-stopping mechanism, showing the serializer used in conjunction nith the coded slide bars and the auxiliary rack mechanism.

As shown more clearly in FIG. 2, each auxiliary rack-stopping mechanism has a support member 128 mounted on a rod 111, which is supported between the side frames of the accounting machine. Each support member has four cut-out portions, within which are rotatably mounted arms 129, each having one end engaging one of the transverse square rods 127 controlled by the solenoids 113 to 116 inclusive. The other end of the arm 129 is positioned within a slot 130 located in a blocking slide 131 slidably mounted within the support member 128. It is seen from this construction that, each time one of the solenoids 113 to 116 inclusive is energized, resulting in the rocking of the associated square rod 127 in a clockwise direction, the arm 129 of each rack-stopping mechanism, which is mounted on the actuated rod, moves its associated blocking slide 131 to the right as viewed in FIG. 2. Cooperating with each of the blocking slides 131 are the coded slide bars 105 to 108 inclusive (FIG. 3). Each of the coded slide bars contains a pair of slots 132, in which is positioned the necked portion of a transverse rod 133, which is mounted between the side frames 123 and 136 and which acts as a support for the slide bars. Urging each of the slide bars to move vertically is a spring 134, mounted on one end of the coded slide bar and a support rod 135 (FIGS. 2 and 5), which in turn is mounted between the machine side frames 136 and 123. Located along one edge of the coded slide bars is a series of notches 137 (FIGS. 2 and 3), which vary in size and number for a purpose that will be explained more fully hereinafter. The opposite edge of each slide bar has a projection 138, which normally engages an associated blocking slide 131, which, when so engaged, holds said slide bar against the action of its spring 134. Each of the blocking slides 131 is urged toward its blocking position with the projection 138 of its associated slide bar by a compression spring 139 (FIG. 2) located within a cavity in the support member 128.

As seen more clearly from FIG. 3, positioned between the coded slide bars 106 and 107 of each rack-stopping mechanism is a stationary bar 140 mounted on the transverse rods 133. This stationary bar has a series of notches 137 along one of the edges adjacent and in the same plane as the notches of the other coded slide bars. During the reading of the ledger card, energization of any of the solenoids 113 to 116 inclusive results in the clockwise rocking of the transverse rods 127, which movement is transmitted to the arm 129 of each auxiliary rack mechanism in a manner described previously. The rocking movement of the arm 129 moves its associated blocking slide 131 against the urging of the spring 139 and out of engagement with the projection 138 of its associated coded slide bar, thereby releasing the slide bar to the action of its spring 134. This results in the upward movement of the slide bar until the bottom edge of the slots 132 engages the transverse rods 133. In this position, the slide bar blocks the movement of the blocking slide 131 to its home position under the action of the spring 139. As will be disclosed hereinafter, only the coded slide bars of one rack-stopping mechanism are released for movement by the spring 134, due to latching of all the slide bars at their lower end by a latch mechanism controlled by the serializer 117. Movement of any of the coded slide bars 105 to 108 inclusive or in combination with any other of the slide bars of any one rack-stopping mechanism aligns one of the notches 137 of each of the slide bars and the stationary bars 140 with each other to provide a positional representation of any of the decimal digits 1 to 11 inclusive and zero, corresponding to the digit read by the reading head 85 in binary code. Thus, if an electrical impulse representing the decimal numeral "one" is read in binary code from the magnetic stripe 118 (FIG. 6) by the reading head 85, the solenoid 113 is energized, and the slide bar 105 is released for movement, resulting in alignment of the first lowermost notches (FIG. 3) in each of the slide bars of the rack-stopping mechanism. If the decimal numeral "nine" is read, electrical impulses from the magnetic stripes 118 and 121 will energize the solenoids 113 and 116, thereby releasing the slides 105 and 108 for movement, resulting in the alignment of notches on the ninth notch from the bottom of the slide bar 140. This alignment of the notches 137 provides a slot which coacts with the auxiliary rack-stopping mechanism carriage 104 (FIGS. 1C and 2) for positioning the auxiliary rack 103 according to the digits set up in the coded slide bars. In a manner to be described more fully hereinafter, the auxiliary rack 103 engages and positions the rack 54 of an amount bank commensurate with the decimal digit set up in the coded slide bars. Thus the coded slide bars provide a means whereby the digit read by the reading head 85 in binary code from a magnetic stripe is represented in its decimal form by the position of the rack of the amount bank.

Each of the auxiliary racks 103 of the rack-stopping mechanisms is slidably mounted for vertical movement on a pair of transverse supports 141 (FIGS. 1C and 5) mounted between the side frames of the accounting machine. Each auxiliary rack has attached at its upper portion one end of a spring 142, the other end of which is connected to a transverse rod 143 (FIG. 5) mounted between the side frames 123 and 136 of the accounting machine. The action of the spring 142 urges its associated auxiliary rack to move in an upward direction for a distance determined by the coded slide bars in a manner that will now be described. To control the positioning of the auxiliary rack, there is slidably supported on each auxiliary rack, by means of a pair of studs 144, an auxiliary rack-stopping carriage 104 (FIGS. 1C and 5), which is composed of a pair of side frames 145, mounted on transverse spacer rods 146. Mounted between the side frames 145 are a pair of guide plates 147, whose function is to guide a sensing plate 148 for longitudinal movement as viewed in FIG. 2. The sensing plate is so constructed that one edge overhangs each of the side frames 145, the sensing plate also containing a notch for accommodating a spring 149 (FIG. 5) mounted between two of the spacer rods 146. It will be seen that action of the spring 149 continuously urges the sensing plate 148 in a direction which results in the sensing of an alignment of the notches 137 in the coded slide bars during the time the auxiliary rack travels in its upward movement. Upon sensing of the notches, the sensing plate moves to the right, as viewed in FIG. 2, into engagement with the notches under the action of the spring 149.

Mounted between a stud 150, located on the auxiliary rack 103, and one of the transverse spacer rods 146 of the stopping carriage is a spring 151, the action of which forces the carriage to move in a direction down and to the right, as viewed in FIG. 2, thus keeping the carriage in a position adjacent the notched ends of the coded slide bar. This action is due to the directional positioning of a pair of slots 152, which are located within the side frames 145 and within which are positioned studs 144. It will be seen that the positioning of the carriage in this manner increases the tension in the spring 149 due to the movement of the spacer rods 146 on the carriage, while the sensing plate 148 remains stationary prior to the sensing of the notches in the coded slide bar. The positioning of the carriage in this manner allows the sensing plate 148 to engage the aligned notches, which results in the locking of the carriage in position, thus stopping the auxiliary rack. As will be described in more detail hereinafter, the stopping of the auxiliary rack 103 positions a stud 158 (FIG. 1C), mounted on the upper portion of the auxiliary rack, adjacent to one of a series of stepped blocking surfaces 159, which forms part of the extension actuator 57, thus controlling the rearward movement of the amount rack 54. It will be seen from this arrangement that the decimal numeral set up in the coded slide bars will position the auxiliary rack in such a manner that the extension actuator and the amount rack to which it is attached will move a distance commensurate with the value of such a numeral.

The mechanism disclosed so far has provided for the positioning of the auxiliary racks by the coded slide bars according to the data read in binary code from the ledger card. This data is read serially from the ledger card; that is, the first line read on the ledger card contains the data to be inserted in the first amount bank, data contained on the second line read to be inserted into the second amount bank, etc. Each time data in the form of electrical impules is read from the ledger card, one or more of the solenoids 113 to 116 inclusive will be energized to rotate their associated transverse rods 127, resulting in the actuation of the blocking slide 131 of each rack-stopping mechanism controlled by the actuating rod 127. In order to insure that the data will be entered into the proper amount bank, there is provided a mechanism which sequentially releases the proper rack-stopping mechanism to the action of the energized solenoid. Such a mechanism will now be described.

Referring to FIG. 1C, there is shown located adjacent to the lower portion of the auxiliary rack 103 one of a pair of levers 153, each rotatably supported on a rod 154 mounted between the side frames of the accounting machine. Mounted between each of the levers 153 is a guide rod 155, located within a cut-out portion 156 of each auxiliary rack 103. In order to actuate the levers, there is attached to one of the levers 153 one end of a link member 157, the other end of which (not shown) is attached to a cam follower which in turn is controlled by a cam located on the main cam line 60 (FIG. 1B) in a manner well known in the art. Counter-clockwise rocking of the levers 153, as viewed in FIG. 1C, during a machine operation removes the rod 155 from engagement with the auxiliary racks to allow each of the auxiliary racks to be actuated, as will be described more fully hereinafter.

Associated with the auxiliary rack-stopping mechanism is the serializer 117 for controlling the setting of each of the auxiliary rack-stopping mechanisms during the sequential reading of the data from the ledger card. The serializer comprises a series of blade actuators 160 (FIG. 2), each mounted intermediate its ends on a collar 161 (FIG. 5), pinned to a shaft 162. The shaft 162 is rotatably supported between the side frames 123 and 136 and has one end extending through the side frame 123. Mounted on this extended end is a ratchet drive wheel 163 (FIGS. 4 and 5), which coacts with a drive pawl 164 to rotate the shaft 162. Mounted between the side frame 123 and a side plate 165, which in turn is mounted on the end of the shaft 162, is a solenoid 166 for actuating the drive pawl 164. The pawl is mounted on one end of a lever 167, the other end of which is rotatably mounted on a shaft 168, which is part of a support frame 169 supporting the solenoid 166. The lower portion of the lever 167 has an arm portion 170, on which is mounted an armature plate 171. Mounted on the support frame 169 is a spring 200, one end of which engages a top portion of the lever 167, urging said lever clockwise as viewed in FIG. 4. Energization of the solenoid 166 attracts the armature 171, thereby rocking the lever 167 counter-clockwise about the shaft 168, against the action of the spring 200, resulting in the withdrawal of the drive pawl 164 to the left, as viewed in FIG. 4, for engagement with a tooth of the ratchet wheel 163. Upon de-energization of the solenoid 166, the pawl 164 is driven to the right under the action of the spring 200, thereby rotating the ratchet wheel 163 counter-clockwise, resulting in the rotation of the shaft 162. Mounted on the rear portion of the solenoid support frame 169 is a detent blade 172, which engages the ratchet wheel to prevent any clockwise rotation of the ratchet wheel. Also mounted adjacent to the ratchet wheel and the drive pawl is a guide member 173, which acts to limit the counter-clockwise movement of the ratchet wheel by the jamming of the pawl 164 against the guide member by the ratchet wheel. Rotation of the shaft 162 by operation of the solenoid 166 successively positions each of the blade actuators 160 in a horizontal position, as shown in FIG. 2, in which position they release for movement their associated coded slide bars in a manner which will now be described.

There is shown in FIG. 2 the support member 128 of each rack-stopping mechanism, having slidably located within its lower portion a slide 174, which extends through said support member. Mounted adjacent to each slide 174 at a point below the support member is a locking member 175, rotatably supported on a shaft 176, which in turn is supported between the side frames 123 and 136. The locking member 175 has a latch portion 177, which is capable of engaging, when so positioned, a cut-out portion 178 of the coded slide bars 105 to 108 inclusive of the rack-stopping mechanism, thus preventing the movement of the slide bar under the action of the springs 134 as previously described. Each locking member 175 engages the ends of all the slide bars associated with each rack-stopping mechanism. As seen in FIG. 2, the locking member 175 has two lower extensions 179 and 180, one located adjacent to a stud 181, mounted on the associated auxiliary rack 103, while the other is engaged by one end of a spring 182, the other end of which is attached to a bar 183, extending between the side frames. With this construction, upon rotation of the shaft 162, one of the blade actuators 160 is so positioned as to engage its associated slide 174 and move it to the left, as viewed in FIG. 2. Actuation of the slide 174 results in the left end portion of the slide engaging and rocking the locking member 175 counter-clockwise against the action of the spring 182. When this occurs, the latch portion 177 on the locking member 175 is disengaged from each of the coded slide bars, thereby releasing each of said bars for upward movement under the action of the springs 134. This action of the serializer occurs after the digit has been read by the reading head from the magnetic stripes on the ledger card and one or more of the blocking slides 131 have been actuated in a manner described previously to allow the associated slide bars to be positioned in this actuated position, preparatory to the stopping of the auxiliary rack 103.

After each digit is read by the reading head, and after the appropriate blade actuator 160 of the serializer 117 has released the actuated slides, those solenoids which have been energized are de-energized, which results in their transverse rods 127 and the arm 129 being rotated counter-clockwise, as viewed in FIG. 2. The slots 130 in the blocking slide 131 are large enough to accommodate the counter-clockwise movement of the arm 129 for those slides 131 which have been actuated by the springs 134 and which now prevent their slides from returning to its home position under the action of the spring 139. Thus the solenoids are positioned for the reading of the next digit by the reading head. It will be seen that the use of the serializer allows only four solenoids to be used in the actuation of the slides of all of the support members 128 located in the accounting machine.

As disclosed previously, the setting of the coded slide bars by operation of the serializer occurs during the driving of the ledger card toward the rear of the machine, followed by the positioning of the ledger card at the proper printing line. The rotation of the serializer 117 continues throughout the reading cycle until all of the slide bars of each support member 128 have been set to represent the old balance. The accounting machine then is cycled, during which operation the cam-actuated lever 153 is rotated in a manner described previously, thereby releasing each of the auxiliary racks 103 to the action of their springs 142, resulting in the positioning of the racks according to the data to be inserted into the amount racks. Subsequently, each of the amount racks 54 is released for rearward movement during the first half of a machine cycle in a manner well known in the art. This movement continues until the appropriate stepped blocking surface 159 of the extension rack 57 engages the stud 158 of its associated auxiliary rack, thereby stopping the amount rack in the position representing the digit read from the ledger card. When all of the amount racks have been so positioned, the appropriate totalizer 67 is brought into engagement with the positioned amount racks preparatory to the adding of the old balance data into the totalizer upon the return movement of the racks to their home position during the second half of the machine operation.

As the machine operation continues, the levers 153 are again rotated clockwise, as viewed in FIG. 1C, by the cam line, thereby allowing the rod 155 to engage each of the auxiliary racks 103, moving said racks toward their home position. As the auxiliary racks move downwardly, an arm 184 (FIG. 1C), mounted midway on each of the auxiliary racks and located adjacent to the coded slide bars, engages the top portion of each of the actuated slide bars, moving the slide bars toward their home position. Prior to this engagement of the slide bars by the arm 184, the stud 181 engages the lower extension 179 of the locking member 175, thereby rocking said member counter-clockwise, resulting in the latch portion 177 being moved from an engaging position with the recessed portions 178 of the coded slide bars. The action of the lever 153 moves the auxiliary racks and the slide bars past their home position, allowing the above-described action of the latch portion 177 to occur. Continued downward movement of the actuated slide bars releases the blocking slides 131 to a blocking position under the action of their springs 139. The levers 153 then are rocked counter-clockwise by the cam line, moving the auxiliary racks 103 and the slide bars into their home position. This movement allows the latch portion 177 of the locking member 175 to latch each of the coded slide bars under the action of the spring 182. Clockwise rotation of the locking member 175 moves its associated slide 174 to the right, as viewed in FIG. 2, until a raised portion 204 of the slide engages one side of a cavity 206 located within the support member 128. This positions the slide so as to be engaged by the blade actuator 160 of the serializer in a subsequent operation. As shown in FIG. 2, the locking member 175 of the first amount bank is held in an unlatched position due to the home position of the serializer 117. The slide code bars of the first amount bank are held in home position by their associated blocking slides 131. The rack-stopping mechanism is thus positioned for a subsequent old balance readout operation.

Immediately after the auxiliary racks 103 start toward their home position, the amount racks 54 are moved toward the front of the machine in a resetting operation. During this movement, the amount representing the old balance is entered into the totalizer in a manner well known in the art. As part of this operation, the old balance is printed on the ledger card by the type sector 61. When the amount racks 54 have reached their home position, the accounting machine carriage is tabulated to the next operating position as determined by the carriage stops located on the front of the machine.

At the next machine position, information about the current transaction is then introduced into the accounting machine through the use of the keyboard, and the amount is added to or subtracted from the old balance set up in the totalizers in a standard accounting machine operation, as disclosed fully in the Christian et al. reference previously cited. At the end of this operation, the amount set up in the totalizers constitutes the new balance, and the carriage moves to the next position as determined by the carriage stops.

As soon as the carriage reaches the next position, a machine cycle is automatically initiated. During this operation, the totalizers are moved into engagement with the amount racks to control the positioning of the racks commensurate with the amount of the new balance in a manner well known in the art and fully described in the previously cited Christian et al. patent. As shown in FIG. 1C, attached to the rear of the extension rack 57 is a rack member 185, slidably mounted on a support member 186 located between the side frames of the accounting machine. The rack 185 has, formed on its upper and lower edges, upturned projections 187, each of which coacts with a series of read-out switches 188, which are attached to a support 189 mounted between the side frames of the accounting machine. Each of the read-out switches is energized by a movable switch-closing member 190, to which is attached one end of a linkage system 191, the other end of which engages the main cam line 60 in a manner well known in the art. As disclosed more fully in FIG. 4B and on page 14 of the previously-mentioned Robertson et al. patent, the switch-closing member 190 contains a plurality of actuating elements (not shown), one of which is associated with each of the read-out switches 188. Upon the downward movement of the member 190, one of the elements is set by engagement with the projection 187, which, upon the return movement of the member 190, closes its associated read-out switch. It will be seen from this arrangement that, after the amount racks have been set by the totalizers to positionally represent the new balance, each rack member 185 will have also positioned its projection 187 to represent the new balance, each rack member 185 will have also positioned its projection 187 to represent the digit of that amount bank which constitutes the new balance. Subsequent to this during the machine operation, the cam line 60 of the accounting machine actuates the linkages 191, thereby moving the switch-closing member 190 toward the rack member 185, resulting in the projection 187 engaging and closing one of the elements of the readout switches 188 corresponding to the digit which is to be recorded on the ledger card. While two sets of the readout switches are shown, only one set of switches is necessary for transferring the new balance to the ledger card. The other set of switches may be used for controlling a tape recorder to record the new balance as part of the data-processing operation.

During the second half of the machine cycle, the new balance, set up in the type sectors during the first half of the machine cycle in a manner described previously, is printed on the ledger card. Also, the linkage system 191 is rocked by the cam line, thereby returning the switch-closing member 190 to its home position, resulting in the closing of the readout switch corresponding to the digit set up in the amount rack, and the amount racks are returned to their home position. As disclosed more fully in the reference to Robertson et al. cited previously, the read-out switches 188 are of such a construction that, once set, they remain set until a subsequent sensing operation, at which time they are returned to their home position. The accounting machine then moves to the next columnar position, in which the new balance is to be inserted into the magnetic stripes located on the ledger card.

Referring to FIG. 1C, there is shown located adjacent to the rear portion of the serializer 117 a support member 193, which is positioned between the side frames of the accounting machine and on which are mounted a plurality of switches 192, which coact with the blade actuators 160 of the serializer (FIG. 2), there being one switch for each blade actuator. The switches 192 are part of an electrical circuit (not shown) which includes the readout switches 188 and the read head 85. When the carriage reaches the next columnar position, the ledger card is driven toward the rear of the machine by operation of the drive roller 86 in a manner described previously. Upon the sensing of the hole 99 in the ledger card by the sensing feeler 88, the ledger card stops and is then driven toward the front of the machine. An electrical signal, generated by the contacts 101 and the switches 102, located on the rear of the carriage, now controls the operation of the serializer 117 as the ledger card starts its movement towards the front of the machine. Operation of the serializer sequentially positions each of the blade actuators in a horizontal position, thereby closing the switches 192, resulting in the digit set up in the readout switches 188 in each of the amount banks being recorded in the magnetic stripes of the ledger card by the read head 85, which now functions as a write head in a manner well known in the art and fully disclosed in the previously-cited Close et al. United States patent application. After all the information concerning the new balance has been recorded on the ledger card, the pressure roller 89 is disabled, and the ledger card is then removed from the machine by the operator. It will be seen from this construction that the combination of the rack-stopping mechanism and the serializer provides a very efficient and fast method of introducing the old balance into the machine, so that a subsequent banking operation may be carried out to create a new balance, thereby allowing the customer's account to be updated with a minimum amount of effort on the part of the operator.

What is claimed is:

1. In an accounting machine apparatus having a plurality of actuator racks each differentially settable, during a machine operation, to a position representative of a numerical value, a mechanism for positioning each of said actuator racks to represent a predetermined value introduced into the accounting machine in the form of an electrical code, the combination including (a) a rack extension for each actuator rack, having a series of stepped blocking surfaces each positionally representing a particular numerical value;

(b) an auxiliary rack mounted adjacent each of said rack extensions and movable in a direction transverse to the rack extension;

(c) means mounted on said auxiliary racks for engaging, when so positioned, one of said stepped blocking surfaces, to stop the corresponding actuator rack in a position representative of the value of the engaged blocking surface;

(d) means normally urging each auxiliary rack to an engaging position with said rack extensions;

(e) means releasably holding said auxiliary racks from movement;

(f) a plurality of sets of selectively displaceable coded position-indicating slides, each set of slides mounted in a first position adjacent one of said auxiliary racks;

(g) means normally urging each slide to a second position;

(h) a plurality of first means releasably holding a corresponding slide of each set in the first position;

(i) a plurality of second means, one for each set of slides, said second means holding the set of slides in the first position;

(j) a plurality of electromagnetic means, one for a corresponding indicating slide of each set, said electromagnetic means being consecutively energized in response to signals of an electrical code introduced into the machine to represent a numerical value;

(k) a plurality of first actuating means, one for each electromagnetic means, said actuating means being operable upon the energization of its associated electromagnetic means for disabling one of said first holding means;

(l) a control means having a plurality of second actuating means, each of said second actuating means being sequentially positioned adjacent one of said sets of indicating slides following the energization of said electromagnetic means for disabling said second means whereby those slides of each set selected by the energization of the electromagnetic means move to said second position to positionally represent the numerical value;

(m) means actuated during operation of the accounting machine for disabling said auxiliary rack holding means;

(n) and sensing means mounted on each auxiliary rack for stopping said auxiliary rack upon sensing the position of its associated set of indicating slides whereby the engaging means on the auxiliary rack is positioned to engage a stepped blocking surface of its associated rack extension to stop the rack in a position representative of the numerical value set in said indicating slides.

2. In an accounting apparatus having a plurality of actuator racks each differentially settable during a machine operation to a position representative of a numerical value, a read-out mechanism for positioning each of said racks to represent a numerical value introduced serially into the accounting machine in the form of a combinational code, comprising (a) a rack extension for each actuator rack having a series of stepped blocking surfaces each positionally representing a particular numerical value;

(b) an auxiliary rack mounted adjacent each of said rack extensions and movable in a direction transverse to the rack extension;

(c) means mounted on said auxiliary racks for engaging, when so positioned, one of said stepped blocking surfaces, to stop the corresponding actuator rack in a position representative of the value of the engaged blocking surface;

(d) means normally urging each auxiliary rack to an engaging position with said rack extensions;

(e) means releasably holding said auxiliary racks from movement;

(f) a plurality of sets of selectively displaceable coded position-indicating slides, each set of slides mounted in a first position adjacent one of said auxiliary racks;

(g) means normally urging each slide to a second position;

(h) stop means mounted on each indicating slide;

(i) a plurality of sliding members, one for each slide, each member engaging said stop means for holding the indicating slide in said first position;

(j) a plurality of rotatable latch members, one for each set of slides, each of said latch members engaging and holding the set of slides in the first position;

(k) a plurality of actuating means, each engaging the corresponding sliding members of an indicating slide in each of said sets, said actuating means, when operated, disengaging said sliding member from the stop means of the indicating slide;

(l) electromagnetic means for operating said actuating means, said electromagnetic means being consecutively energized in response to signals of an electrical code to represent a numerical value;

(m) a control means having a plurality of latch-disabling members, each of said latch-disabling members being sequentially positioned to engage and disable a latch member of each set of slides following the energization of said electromagnetic means to allow those slides of each set selected by the energization of the electromagnetic means to move to said second position to positionally represent the numerical value;

(n) means actuated during operation of the accounting machine for disabling said auxiliary rack holding means;

(o) and sensing means mounted on each auxiliary rack for stopping said auxiliary rack upon sensing the position of its associated set of indicating slides whereby the engaging means on the auxiliary rack is positioned to engage a stepped blocking surface of its associated rack extension to stop the rack in a position representative of the numerical value set in said indicating slides.

3. In an accounting machine, an input device for positionally representing numerical values introduced into the accounting machine in the form of a combinational code, the combination including (a) a plurality of sets of movable slides, the slides of each set being mounted in a parallel side-by-side relation, with each slide bearing a series of code-identifying notches in one edge portion thereof;

(b) a fixed slide parallel to the movable slides of each set and having notches representing numerical values in an edge portion thereof alignable with the code-identifying notches of said movable slides;

(c) means biasing the movable slides of each set in one direction;

(d) first holding means engaging and holding a corresponding movable slide of each set in a first position;

(e) second holding means engaging and holding each set of movable slides in a first position;

(f) a plurality of electromagnetic means consecutively energized in accordance with a part of a combinational code to represent a numerical value;

(g) a plurality of actuating arms each mounted on an elongated member controlled by one of said electromagnetic means and engaging in an operative manner one of said first holding means, each of said actuating arms being operated upon the energization of its associated electromagnetic means to disengage the first holding means from the movable slides;

(h) control means having a plurality of actuating members, one for each set of movable slides, said members being sequentially positioned upon operation of said control means to disable the second holding means of each set of movable slides;

(i) and means for operating said control means whereby each set of movable slides is sequentially released for movement to a biased position to cause certain of the notches in the movable slides to register with one of the notches in the fixed slide to represent the numerical value determined by the energization of the electromagnetic means.

4. In an accounting machine having magnetic means for reading data in the form of binary code, a device for positionally indicating a numerical value introduced into the accounting machine by said reading means in the form of electrical pulses representing a binary code, the combination including (a) a plurality of sets of movable slides, the slides of each set being mounted in a parallel side-by-side relation, with each slide bearing a series of code-identifying notches in one edge portion thereof;

(b) a fixed slide parallel to the movable slides of each set and having notches representing numerical values in a edge portion thereof alignable with the code-identifying notches of said movable slides;

(c) means biasing the movable slides of each set in one direction;

(d) stop means mounted on each movable slide;

(e) a plurality of sliding members each normally engaging the stop means of each movable slide to hold said slides in a first position;

(f) a plurality of latch members each engaging and holding a set of movable slides in a first position;

(g) a plurality of electromagnetic means connected to said magnetic means and consecutively energized by electrical pulses sent from said magnetic means representing, in binary code, a numerical value;

(h) a plurality of actuating means, each engaging the sliding member of a corresponding slide of each set, said actuating means disengaging the slide members from said stop means upon operation;

(i) means interconnecting each of said actuating means with one of said electromagnetic means to operate said actuating means upon energization of said electromagnetic means;

(j) control means having a plurality of rotatable actuating members, one for each set of movable slides, said control means being operated to sequentially position one of said actuating members in a position engaging and disabling one of said latch members;

(k) and means for operating said control means in sequence with the energization of said electromagnetic means whereby each set of movable slides is released for movement to a biased position to cause certain of the notches in the movable slides to register with one of the notches in the fixed slide to represent the numerical value determined by the energization of said electromagnetic means.

5. In an accounting apparatus, the combination comprising (a) a plurality of actuator members;
(b) means to differentially move said members to positions indicative of different character values;
(c) an extension mounted on the rear of each of said members and having a number of stepped blocking surfaces for controlling the position of said actuating members, each of said surfaces being representative of a different character value;
(d) means for engaging one of said blocking surfaces to position each of said actuator members commensurate with a character value introduced into said accounting apparatus in the form of electrical pulses representative of a binary code, including
(e) a group of slides for each actuator member, one edge portion of each slide in each group having notches therein in binary code, the opposite parallel edge portion of each slide having a stop member projecting away therefrom;
(f) a rack member mounted adjacent the notched side of each group of said slides and a rear extentension, said member movable in a direction transverse to said extension and having a blocking member mounted thereon engageable with one of said blocking surfaces when so positioned;
(g) means releasably holding said rack member in a non-engaging position;
(h) first means engaging the stop member of a corresponding slide of each group for holding each slide in a first position;
(i) second means engaging each group of slides in a first position;
(j) spring means for moving each slide of each group to a second position;
(k) actuating means interconnecting the first means of a corresponding slide of each group of slides;
(l) electromagnetic means for each actuating means, said electromagnetic means being energized by electrical pulses representing a character value to operate said actuating means for disabling said first means;
(m) control means having a plurality of blade actuators, each mounted in a plane with one of said second means, said actuators being sequentially positioned to disengage said second means, thereby releasing those slides selected by the energization of the electromagnetic means to said second position, wherein certain notches of said slides are transversely aligned with one another to represent the particular character value transmitted into the accounting machine by the energization of said electromagnetic means;
(n) means for operating said control means;
(o) means carried on said rack member for sensing said transversely-aligned notches for arresting said rack member in an engaging position;
(p) and means actuated during operation of the accounting machine for disabling said rack-holding means to allow the rack member to be positioned by said sensing means to stop said extension in a position commensurate with the character value represented by the energization of said electromagnetic means.

6. In an accounting machine apparatus having a plurality of actuator racks each differentially settable, during a machine operation, to a position representative of a numerical value, and a mechanism for positioning each of said racks to represent a predetermined value introduced into the accounting machine in the form of a binary code, the combination including (a) a rack extension for each actuator rack having a series of stepped blocking surfaces each positionally representing a particular numerical value;
(b) an auxiliary rack mounted adjacent each of said rack extensions and movable in a direction transverse to the rack extension;
(c) means mounted on said auxiliary racks for engaging, when so positioned, one of said stepped blocking surfaces, to stop the corresponding actuator rack in a position representative of the value of the engaged blocking surface;
(d) means normally urging each auxiliary rack to an engaging position with said rack extension;
(e) means releasably holding said auxiliary racks from movement;
(f) a plurality of sets of movable slides, the slides of each set being mounted in a parallel side-by-side relation, with each slide bearing a series of code-identifying notches in one edge portion thereof;
(g) a fixed slide parallel to the movable slides of each set and having notches representing numerical values in an edge portion thereof alignable with the code-identifying notches of said movable slides;
(h) means biasing the movable slides of each set in one direction;
(i) first holding means engaging and holding a corresponding movable slide of each set in a first position;
(j) second holding means engaging and holding each set of movable slides in a first position;
(k) a plurality of electromagnetic means consecutively energized in accordance with a part of a combinational code to represent a numerical value;
(l) a plurality of actuating means each controlled by an electromagnetic means and each connected to one of said first holding means, said actuating means being operated upon the energization of its electromagnetic means to disengage the first holding means from the movable slides;
(m) control means having a plurality of actuating members, one for each set of movable slides, said members being sequentially positioned upon operation of said control means to disable the second holding means of each set of movable slides;
(n) means for operating said control means to release those slides of each set selected by the energized electromagnetic means for movement to a biased position to cause certain of the notches in the movable slides of each set to register with one of the notches in the fixed slide;
(o) means actuated during operation of the accounting machine for disabling said auxiliary rack-holding means;
(p) and sensing means mounted on each auxiliary rack for stopping said auxiliary rack upon sensing the registered notches of its associated set of movable slides whereby the engaging means on the auxiliary rack is positioned to engage a stepped blocking surface of its associated rack extension to stop the rack in a position representative of the numerical value determined by the energization of the electromagnetic means.

7. The mechanism of claim 6 wherein said sensing means includes a carriage frame slidably mounted for a limited diagonally transverse movement in a sensing direction on said auxiliary rack, a spring mounted on said auxiliary rack urging said carriage frame in a sensing direction, a sensing plate slidably mounted on said carriage frame, and a resilient means mounted on said carriage frame for urging said plate in a sensing direction whereby said plate, upon sensing a transverse alignment of notches in said movable slide, moves into engagement with said notches, resulting in the stopping of the carriage frame and said auxiliary rack.

8. The mechanism of claim 6 wherein the actuator members of said control means each comprise an elongated blade rotatably mounted on a shaft intermediate its ends, each blade being mounted on said shaft in a side-by-side relation and offset with the adjacent blades by a constant angle, whereby, upon rotation of said shaft, each blade is sequentially positioned in the same horizontal plane to disable the second holding means of its associated set of movable slides.

9. In an apparatus of the class described having a plurality of actuator racks differentially settable during a machine operation to a position representative of a numerical value, and a mechanism for positioning each of said racks to represent a predetermined value introduced into the apparatus in the form of a binary code, the combination including
  (a) a rack extension for each actuator rack, having a series of stepped blocking surfaces each positionally representing a particular numerical value;
  (b) an auxiliary rack mounted adjacent each of said rack extensions and movable in a direction transverse to the rack extension;
  (c) means mounted on said auxiliary racks for engaging, when so positioned, one of said stepped blocking surfaces, to stop the corresponding actuator rack in a position representative of the value of the engaged blocking surface;
  (d) means normally urging each auxiliary rack to an engaging position with said rack extensions;
  (e) means releasably holding said auxiliary racks from movement;
  (f) a plurality of sets of movable slides, the slides of each set being mounted in a parallel side-by-side relation, with each slide bearing a series of code-identifying notches in one edge portion thereof;
  (g) a fixed slide parallel to the movable slides of each set and having notches representing numerical values in an edge portion thereof alignable with the code-identifying notches of said movable slides;
  (h) means biasing the movable slides of each set in one direction;
  (i) first holding means engaging and holding a corresponding movable slide of each set in a first position;
  (j) second holding means engaging and holding each set of movable slides in a first position;
  (k) a plurality of electrical code lines, representing 1–2–4–8 in binary code, over which numeric data is serially transmitted by pulses and combinations of simultaneous pulses representing digit values 1 to 9 inclusive;
  (l) a plurality of electromagnets each connected to one of said binary code lines and energized in response to a pulse transmitted over said line;
  (m) a plurality of actuating means each controlled by one of said electromagnets and connected to one of said first holding means, said actuating means being operated upon energization of the electromagnet to disengage its associated first holding means from its associated movable slides;
  (n) control means having a plurality of actuating members, one for each set of movable slides, said members being sequentially positioned upon operation of said control means to disable the second holding means of each set of movable slides;
  (o) means for operating said control means to release those slides of each set selected by the energized electromagnets for movement to a biased position to cause certain of the notches in the movable slide of each set to register with one of the notches in the fixed slide;
  (p) means actuated during operation of the accounting machine for disabling said auxiliary rack-holding means;
  (q) and sensing means mounted on each auxiliary rack for stopping said auxiliary rack upon sensing the registered notches of its associated set of movable slides whereby the engaging means on the auxiliary rack is positioned to engage a stepped blocking surface of its associated rack extension to stop the rack in a position representing the numerical value transmitted over the binary code lines.

10. In an apparatus of the class described having a plurality of actuator racks differentially settable during a machine operation to a position representative of a numerical value, and a mechanism for positioning each of said racks to represent data introduced into the apparatus in the form of a binary code, the combination including
  (a) a rack extension mounted on each actuator rack and containing a number of stepped blocking surfaces for controlling the position of its associated actuator rack, each of said surfaces being representative of a different numerical value;
  (b) an auxiliary rack mounted adjacent each of said rack extensions and movable in a direction transverse to the rack extension;
  (c) means mounted on said auxiliary racks for engaging, when so positioned, one of said stepped blocking surfaces, to stop the corresponding actuator rack in a position representative of the value of the engaged blocking surface;
  (d) means normally urging each auxiliary rack to an engaging position with said rack extensions;
  (e) means releasably holding said auxiliary racks from movement;
  (f) a plurality of sets of selectively displaceable coded position-indicating slides positioned adjacent said auxiliary racks, each slide having a plurality of notches along one edge portion representative of a binary increment while the opposite parallel edge portion has a stop member projecting away therefrom;
  (g) a slide member normally engaging said stop member for holding each slide in a first position;
  (h) a latch member engaging each set of slides and holding it in a fixed position;
  (i) resilient means biasing each of said slides to a second position;
  (j) a rotatable member interconnecting each slide member of a corresponding slide of each set of slides for disabling said slide member when rotated;
  (k) a plurality of electrical code lines, connected to a data source and representing 1–2–4–8 in binary code, over which numeric data is serially transmitted by pulses and combinations of simultaneous pulses representing digit values 1 to 9 inclusive;
  (l) a plurality of electromagnets, each controlling one of said rotatable members and being connected to one of said electrical code lines in such a manner that a pulse transmitted over one of said lines energizes its associated electromagnet to rotate its rotatable member;
  (m) control means having a plurality of blade actuators, each mounted adjacent and in a plane wih one of said latch members, said control means being operable to successively position each blade actuator to disable its associated latch member, thereby releasing those slides selected by the energization of the electromagnets to a biased position, wherein certain of said notches of said slides are transversely aligned with one another to represent the numeric value transmitted to the electromagnets;
  (o) means for operating said control means;

(p) means actuated during operation of the accounting machine for disabling said auxiliary rack-holding means;

(q) and sensing means mounted on each auxiliary rack for stopping said auxiliary rack upon sensing the transversely-aligned notches of its associated set of slides, whereby the engaging means on the auxiliary rack is positioned to engage a stepped blocking surface of its associated rack extension to stop the rack in a position representative of the numerical value transmitted over the binary code lines to the electromagnets.

References Cited by the Examiner
UNITED STATES PATENTS

| | | | |
|---|---|---|---|
| 1,623,204 | 4/27 | Pierce | 235—61.6 |
| 1,950,187 | 3/34 | Mausel | 235—61.6 |
| 2,323,824 | 7/43 | Maschmeyer | 235—61.6 |
| 2,332,755 | 10/43 | Robertson | 235—61 |
| 2,701,686 | 2/55 | Guttridge | 235—61.6 |
| 3,009,633 | 11/61 | Dilks | 235—61 |
| 3,014,653 | 12/61 | Collison | 235—61.6 |

LEO SMILOW, *Primary Examiner.*